(12) United States Patent
Obuhowich et al.

(10) Patent No.: US 9,447,808 B2
(45) Date of Patent: Sep. 20, 2016

(54) NUT PLATE SEAL CAPS

(71) Applicant: PRC-DeSoto International, Inc., Sylmar, CA (US)

(72) Inventors: George C. Obuhowich, Brampton (CA); Soccorso Rizzello, Toronto (CA); Russell Shellenberger, Simi Valley, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 0 days.

(21) Appl. No.: 14/391,919

(22) PCT Filed: Mar. 15, 2013

(86) PCT No.: PCT/US2013/032387
§ 371 (c)(1),
(2) Date: Oct. 10, 2014

(87) PCT Pub. No.: WO2013/154773
PCT Pub. Date: Oct. 17, 2013

(65) Prior Publication Data
US 2015/0063945 A1    Mar. 5, 2015

Related U.S. Application Data

(60) Provisional application No. 61/622,874, filed on Apr. 11, 2012.

(51) Int. Cl.
| F16B 39/02 | (2006.01) |
| F16B 33/00 | (2006.01) |
| F16B 37/14 | (2006.01) |
| B23P 19/08 | (2006.01) |

(52) U.S. Cl.
CPC .............. *F16B 33/004* (2013.01); *B23P 19/08* (2013.01); *F16B 37/14* (2013.01); *Y10T 29/4997* (2015.01); *Y10T 29/53987* (2015.01)

(58) Field of Classification Search
CPC .. F16B 11/008; F16B 13/142; F16B 33/004; F16B 39/02; F16B 39/021; Y10T 29/4981
USPC ............. 411/82, 337, 372.5, 372.6, 373, 383
See application file for complete search history.

(56) References Cited

U.S. PATENT DOCUMENTS

| 2,710,113 | A |   | 6/1955 | Pritchard |  |
| 3,137,196 | A | * | 6/1964 | Stawinski | ............. F16B 33/004 411/369 |
| 3,469,490 | A | * | 9/1969 | Pearce, Jr. | ............ F16B 33/004 403/288 |
| 3,470,787 | A |   | 10/1969 | Mackie |  |

(Continued)

FOREIGN PATENT DOCUMENTS

| CA | 2827995 | 11/2012 |
| DE | 7238928 U | 1/1973 |

(Continued)

*Primary Examiner* — Roberta Delisle
(74) *Attorney, Agent, or Firm* — Alan G. Towner

(57) ABSTRACT

A cap (10) for sealing a mechanical fastener (200), method for making the cap, and driver and method for applying the cap is disclosed. The cap includes a shell having an exterior surface (14) and an interior surface (16) defining a cavity (18), an opening (19) extending through the shell between the interior and exterior surfaces, and a sealant (13) at least partially filling the cavity. A package and a holder for holding a plurality of cap assemblies are also disclosed.

16 Claims, 8 Drawing Sheets

(56) References Cited

U.S. PATENT DOCUMENTS

| | | | | |
|---|---|---|---|---|
| 3,750,523 | A * | 8/1973 | Fujita | F16B 15/02 411/484 |
| 3,803,972 | A * | 4/1974 | Deutsher | F16B 33/004 411/337 |
| 4,519,974 | A | 5/1985 | Bravenec et al. | |
| 4,826,380 | A * | 5/1989 | Henry | B64D 45/02 156/229 |
| 4,971,745 | A * | 11/1990 | Ferenc | F16B 33/004 264/263 |
| 5,755,908 | A | 5/1998 | Rayburn et al. | |
| 6,036,804 | A | 3/2000 | Rayburn et al. | |
| 6,086,972 | A * | 7/2000 | Rayburn | B25B 23/00 411/373 |
| 7,438,974 | B2 | 10/2008 | Obuhowich | |
| 7,818,940 | B2 * | 10/2010 | Herb | F16B 43/001 411/533 |
| 8,333,537 | B2 * | 12/2012 | Rogers | F16B 31/02 301/35.622 |
| 8,602,764 | B2 | 12/2013 | Hutter, III | |
| 8,616,868 | B2 | 12/2013 | Hutter, III et al. | |
| 8,717,736 | B2 * | 5/2014 | Asahara | F16B 39/225 361/218 |
| 8,882,423 | B2 * | 11/2014 | Watanabe | F16B 37/14 411/337 |
| 8,894,338 | B2 * | 11/2014 | Dobbin | B64D 45/02 411/369 |
| 9,011,062 | B2 * | 4/2015 | Chirol | F16B 33/004 411/372.5 |
| 9,140,291 | B2 * | 9/2015 | Yoon | B64D 45/02 |
| 9,163,656 | B2 * | 10/2015 | Asahara | B64D 45/02 |
| 2009/0147429 | A1 | 6/2009 | Martin Hernandez | |
| 2012/0219380 | A1 | 8/2012 | Hutter, III | |
| 2013/0322982 | A1 * | 12/2013 | Dobbin | B64D 45/02 411/82 |
| 2014/0312148 | A1 | 10/2014 | Jurado Blazquez | |
| 2014/0341675 | A1 * | 11/2014 | Dobbin | B64D 45/02 411/82.1 |
| 2015/0034800 | A1 | 2/2015 | Martinez-Marin | |
| 2015/0184688 | A1 * | 7/2015 | Dobbin | F16B 39/021 411/82.1 |

FOREIGN PATENT DOCUMENTS

| | | |
|---|---|---|
| DE | 202004017837 U1 | 1/2005 |
| EP | 0540434 A1 | 5/1993 |
| EP | 0325222 B1 | 8/1993 |
| EP | 2586537 A1 | 5/2013 |
| EP | 2823946 A1 | 1/2015 |
| FR | 2802268 A1 | 6/2001 |
| GB | 2163817 A | 5/1986 |
| GB | 2220244 | 4/1990 |
| JP | S5483077 A | 7/1979 |
| JP | 02-074612 | 6/1990 |
| JP | 2010254287 | 11/2010 |
| RU | 30680 U1 | 7/2003 |
| RU | 2353516 C2 | 4/2009 |
| WO | 2009063063 A1 | 5/2009 |
| WO | 2013064708 A1 | 5/2013 |
| WO | 2013132115 A1 | 9/2013 |
| WO | 2014201188 A1 | 12/2014 |

* cited by examiner

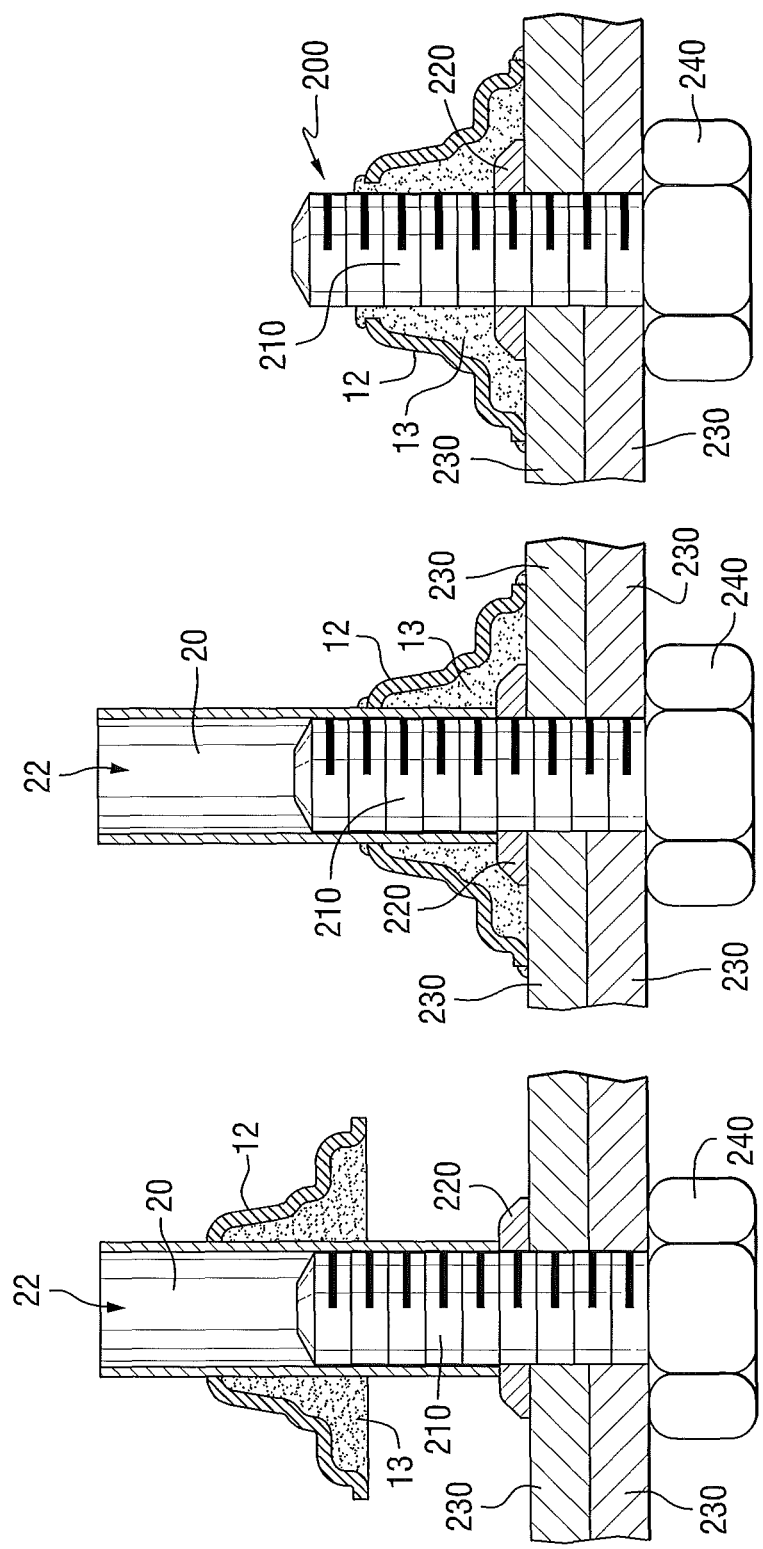

NUT PLATE SEAL CAPS

CROSS-REFERENCE TO RELATED APPLICATIONS

This application claims priority under 35 U.S.C. §119(e) based on U.S. Provisional Patent Application No. 61/622,874, entitled "NUT PLATE CAP," filed on Apr. 11, 2012, and which is expressly incorporated herein by reference in its entirety.

FIELD

The present invention is related to sealant materials, particularly to preformed caps for sealing a mechanical fastener, methods for making such preformed caps, and methods for applying such preformed caps to substrate. The present invention is also related to a driver for applying the sealant materials on the substrate.

BACKGROUND

Dispensing systems for dispensing curable sealants are well known in the art. There are a variety of methods for applying sealant to a fastener using a cap. The methods involve applying the sealant and then shaping it with a cap over the fastener or injecting the sealant into a cap encasing the fastener. These methods require precise metering of the sealant either around the fastener prior to placing the cap around the sealant, or into a cap before placing the cap and sealant over fasteners. These methods are costly and impractical. Moreover, these methods do not provide consistent results.

Preformed sealant caps which are filled with uncured sealant immediately prior to application on the fastener are subject to similar inefficiencies. This extra step of filling the cap with uncured sealant makes application of the sealant on the fastener cumbersome. The typical practice involved applying sealant on many fasteners at one time. The extra step of filling caps complicates the application and adds to the length of time required to apply the sealant on fasteners throughout the substrate. The fact that the sealant cures within a fixed period of time after dispensing complicates dispensing the sealant prior to the application to the fastener.

Furthermore, many manufacturers manually seal nut plate fasteners by extruding and tooling the sealant over the fastener. However, this is a difficult and time-consuming process because many of the fasteners are located in locations that are difficult to access, making it technically difficult to access and seal the fasteners. Additionally, it is often difficult to control the sealant thickness that is applied to the fasteners.

Finally, fasteners are typically manufactured as a series, with fasteners in each series having specific base dimensions and being provided in a range of shaft lengths. Accordingly, preformed sealant caps are typically manufactured for use with each shaft length for each series. This increases production costs.

There is a need, therefore, for a sealant that addresses the inefficiencies and complications of the existing materials.

SUMMARY

In certain embodiments, the invention is directed to a cap for sealing a mechanical fastener comprising a shell having an exterior surface and an interior surface defining a cavity, an opening extending through the shell between the interior and exterior surfaces, and a sealant at least partially filling the cavity.

In certain other embodiments, the invention is directed to a cap assembly for sealing a mechanical fastener comprising a shell having an exterior surface and an interior surface defining a cavity, an opening extending through the shell between the interior and exterior surfaces, a sealant at least partially filling the cavity, and a tube extending through the opening and configured to fit over a shaft of the mechanical fastener, wherein the shell is slidably moveable along an axis of the tube.

In certain other embodiments, the invention is directed to a sealant cap package comprising a holder and a plurality of cap assemblies releasably mounted on the holder, wherein each cap assembly comprises a shell having an exterior surface and an interior surface defining a cavity, an opening extending through the shell between the interior and exterior surfaces, a sealant at least partially filling the cavity, and a tube extending through the opening, wherein the tube is releasably secured to the holder.

In certain other embodiments, the invention is directed to a method of installing a cap on a mechanical fastener, wherein the cap comprises a shell having an exterior surface and an interior surface defining a cavity, an opening extending through the shell between the interior and exterior surfaces, a sealant at least partially filling the cavity, and a tube extending through the opening and configured to fit over a shaft of the mechanical fastener, the method comprising inserting a shaft of the mechanical fastener into the tube, and sliding the shell along an axis of the tube from an initial position to an installed position wherein the sealant contacts a portion of the mechanical fastener and a substrate in which the mechanical fastener is fastened.

In certain other embodiments, the invention is directed to a driver for installing a cap assembly on a mechanical fastener, wherein the cap assembly comprises a shell having an exterior surface and an interior surface defining a cavity, an opening extending through the shell between the interior and exterior surfaces, a sealant at least partially filling the cavity, and a tube extending through the opening and configured to fit over a shaft of the mechanical fastener, wherein the shell is slidably moveable along an axis of the elongated tube, the tool comprising a clamp structured and arranged to releasably engage the tube, and a sleeve structured and arranged to move the shell along the axis of the tube from an initial position to an installed position wherein the sealant contacts a portion of the mechanical fastener and a portion of a substrate to which the mechanical fastener is fastened.

The accompanying drawings, which are incorporated in and constitute a part of this specification, illustrate some non-limiting embodiments of the invention and together with the description, serve to explain the invention.

BRIEF DESCRIPTION OF THE DRAWINGS

FIG. 8 is a side cross-sectional view of the cap in combination with the tube illustrated in FIG. 5 and showing the tube installed on the mechanical fastener;

FIG. 9 is a side cross-sectional view of the cap in combination with the tube illustrated in FIG. 5 and showing the cap engaged with the mechanical fastener;

FIG. 10 is a side cross-sectional view of the cap in combination with the tube illustrated in FIG. 5 and showing the tube removed and the cap engaged with the mechanical fastener;

DETAILED DESCRIPTION

Wherever possible, the same reference numbers will be used throughout the Figures to refer to the same or like parts.

For purposes of this specification, it is to be understood that the invention may assume various alternative variations and step sequences, except where expressly specified to the contrary. Moreover, other than in any operating examples, or where otherwise indicated, all numbers expressing, for example, quantities of ingredients used in the specification and claims are to be understood as being modified in all instances by the term "about". Accordingly, unless indicated to the contrary, the numerical parameters set forth in the following specification and attached claims are approximations that may vary depending upon the desired properties to be obtained by the present invention. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges subsumed therein. For example, a range of "1 to 10" is intended to include all sub-ranges between (and including) the recited minimum value of 1 and the recited maximum value of 10, that is, having a minimum value equal to or greater than 1 and a maximum value of equal to or less than 10.

As used herein, the term "sealant" refers to a composition that, when applied to an aperture (such as the joint or space formed by the interface between two parts), has the ability to resist atmospheric conditions, such as moisture and temperature, and at least partially block the transmission of materials, such as water, fuel, and/or other liquids and gasses, which might otherwise occur at the aperture. Sealants, therefore, are often applied to a peripheral edge surface of a component part for the purpose of hindering material transport to or from such a part. Sealants often have adhesive properties, but are not simply adhesives that do not have the blocking properties of a sealant.

Figure 1:
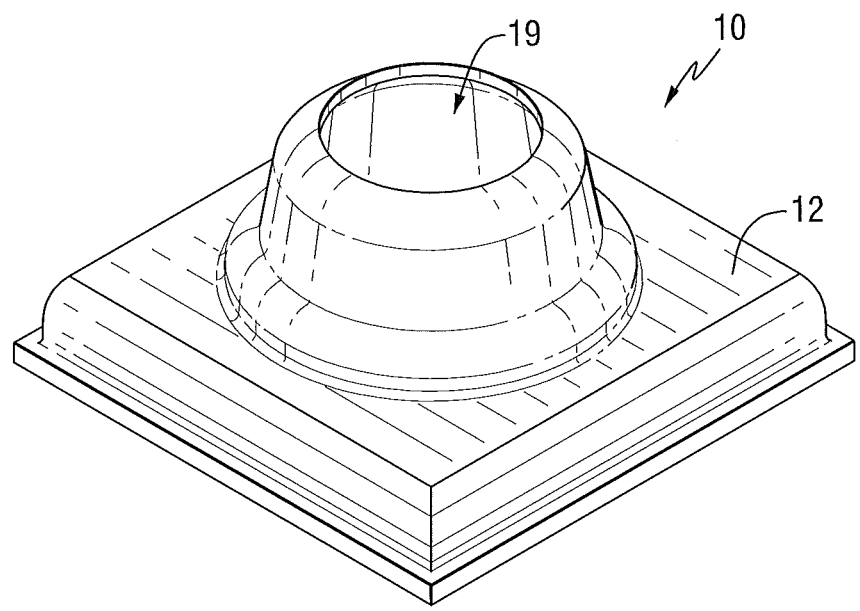
FIG. 1 illustrates a top isometric view of an embodiment of the cap for sealing a mechanical fastener.
Figure 2:
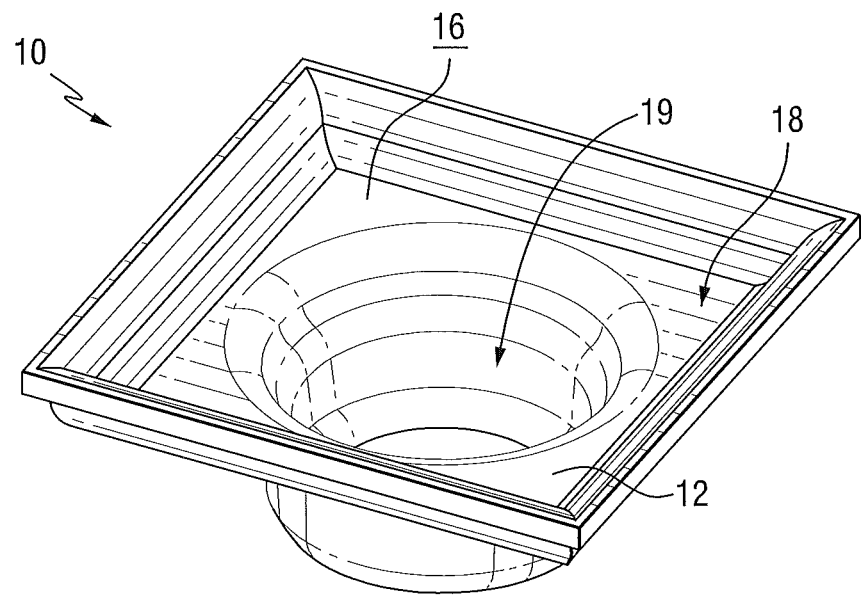
FIG. 2 illustrates a bottom isometric view of the cap illustrated in FIG. 1.
Figure 3:
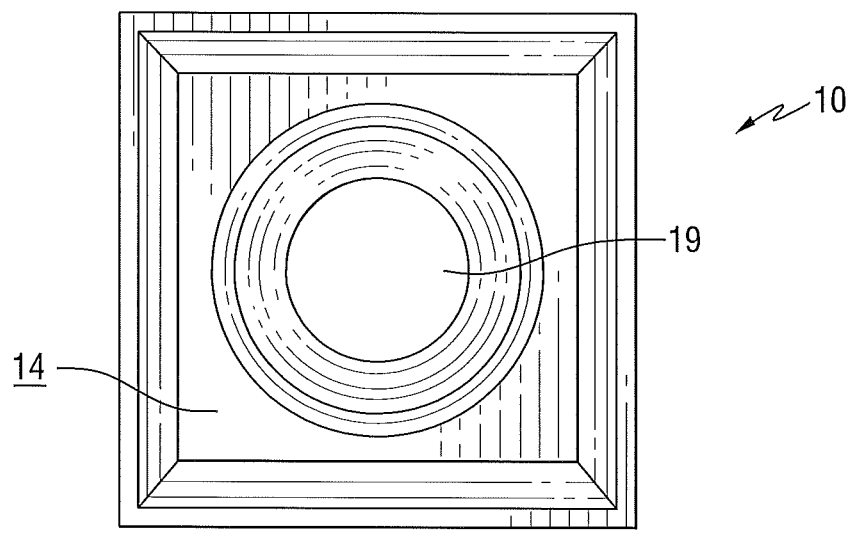
FIG. 3 is a top view of the cap illustrated in FIG. 1.
Figure 4:
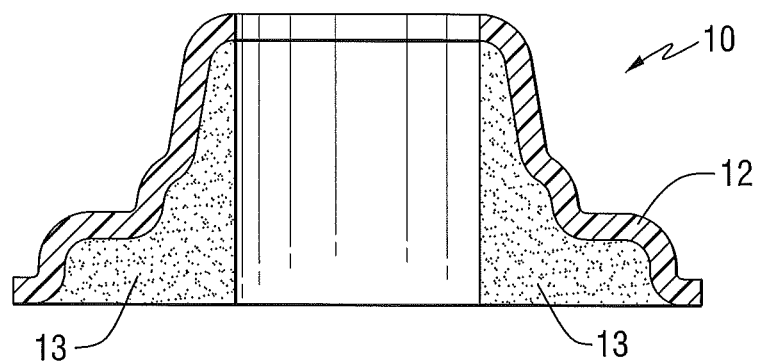
FIG. 4 is a side cross-sectional view of the cap illustrated in FIG. 1.
Figure 6:
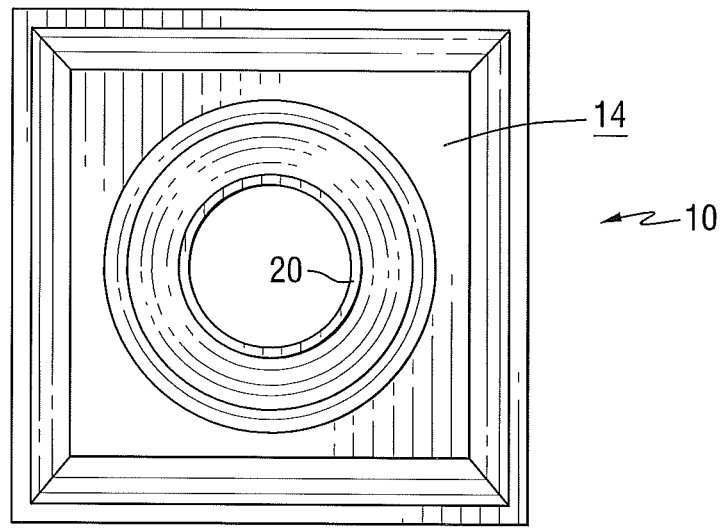
FIG. 6 is a top view of the cap in combination with the tube illustrated in FIG. 4.

FIGS. 1 to 4 illustrate a non-limiting embodiment of a cap 10 for sealing a mechanical fastener 200. Each cap 10 has a shell 12 that is configured to engage a base 210 of a fastener. Each shell 12 has interior 16 and exterior 14 surfaces. The interior surface 16 of the shell defines a cavity 18. As illustrated in FIGS. 3 and 6, a first quantity of sealant 13 is positioned in the cavity 18 which, in certain embodiments, may be at least partially unhardened. The shell 12 may be made of any rigid material, including a second quantity of sealant that is at least partially hardened, plastics including hydrophobic polymers, and the like. In certain embodiments, the shell and the sealant comprise the same composition.

The term "at least partially unhardened" is meant to include the entire range of hardness from completely liquid to somewhat gelled at least to the point that the first quantity of sealant can conform to the surface of the substrate. Conversely, the term "at least partially hardened" is meant to include the entire range of hardness from completely cured to somewhat gelled at least to the point that the second quantity of sealant can be manually or mechanically handled for application to the substrate. Therefore, it is contemplated that portions of the sealant can be hardened or unhardened such that the sealant is not uniform throughout the quantity of the sealant. For example, sealant does not have to harden at the same time, and can leave the potential for pockets of unhardened sealant in almost completely cured sealant and hardened sealant in almost completely uncured sealant.

The hardening or curing time for sealant depends on the pot life of the sealant composition and can vary widely ranging from minutes to hours. In another non-limiting embodiment, the second quantity of sealant may be thermally regulated to keep it from becoming completely cured prior to positioning the first quantity of sealant in the cavity.

As illustrated in FIGS. 1 to 4, an opening 19 extends through the shell 12. In a non-limiting embodiment illustrated in FIGS. 5 to 7, a tube 20 having first 22 and second 24 ends extends through the opening 19. As illustrated in FIGS. 8 and 9, the tube 20 may be configured to fit over a shaft 210 of the fastener 200. In certain embodiments, the shell 12 may be slidably moveable along an axis A of the tube 20. The tube 20 may be made of any rigid material that is compatible with the first quantity of sealant 13, including but not limited to cardboard, plastic, and the like. In certain embodiments, an interior surface (not shown) of the tube 20 may be coated with a material that is compatible with the first quantity of sealant 13. As used herein, the term "compatible," when used in reference to the sealant, means that the referenced material does not adversely affect the sealant properties of the sealant.

A non-limiting embodiment of making the cap 10 of the present invention comprises assembling a cap assembly 100 by removing a top portion of a shell 10 to form an opening 19 that extends between the interior and exterior 14, 16 surfaces of the shell 10 (FIGS. 1-4). One skilled in the art knows various methods of removing the top portion of the shell 10 to expose the opening 19.

Figure 5:
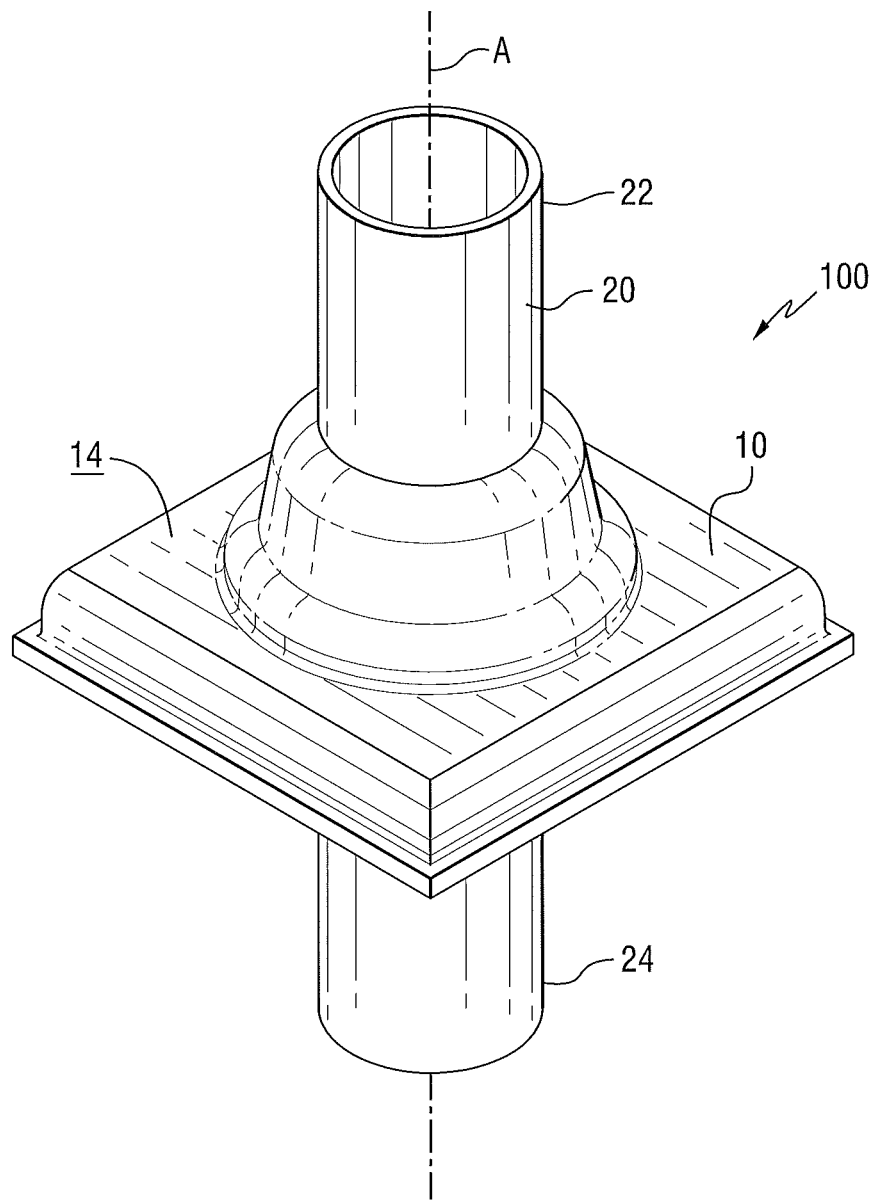
FIG. 5 is an isometric view of the cap illustrated in FIG. 1, shown in combination with a tube extending through the opening in the cap that is configured to engage a shaft of a mechanical fastener.
Figure 7:
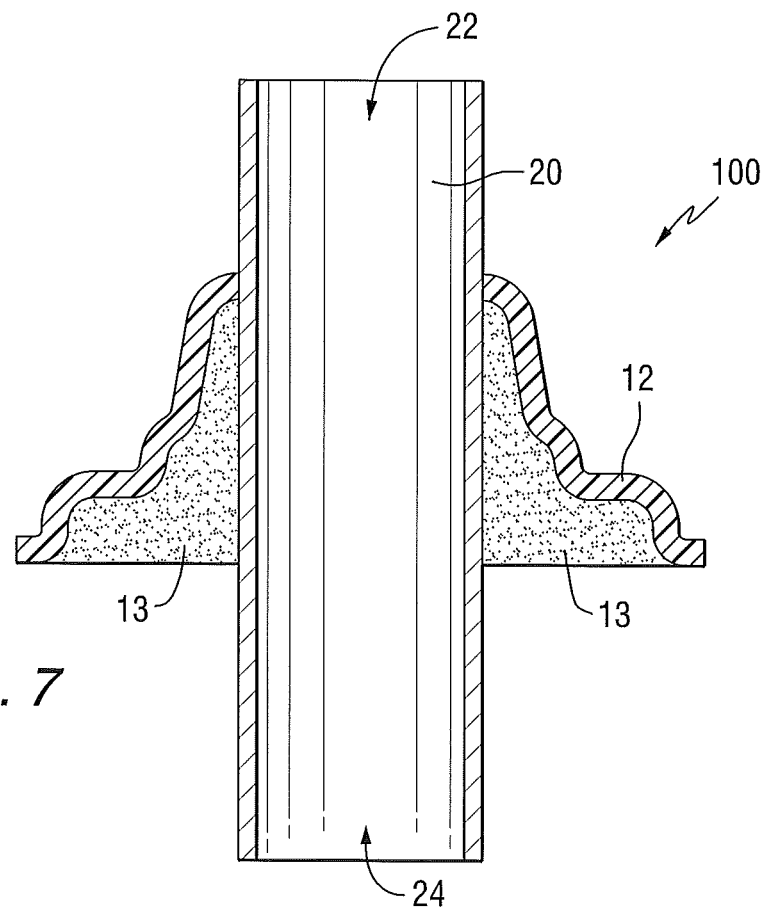
FIG. 7 is a side cross-sectional view of the cap in combination with the tube illustrated in FIG. 5.
Figure 11:
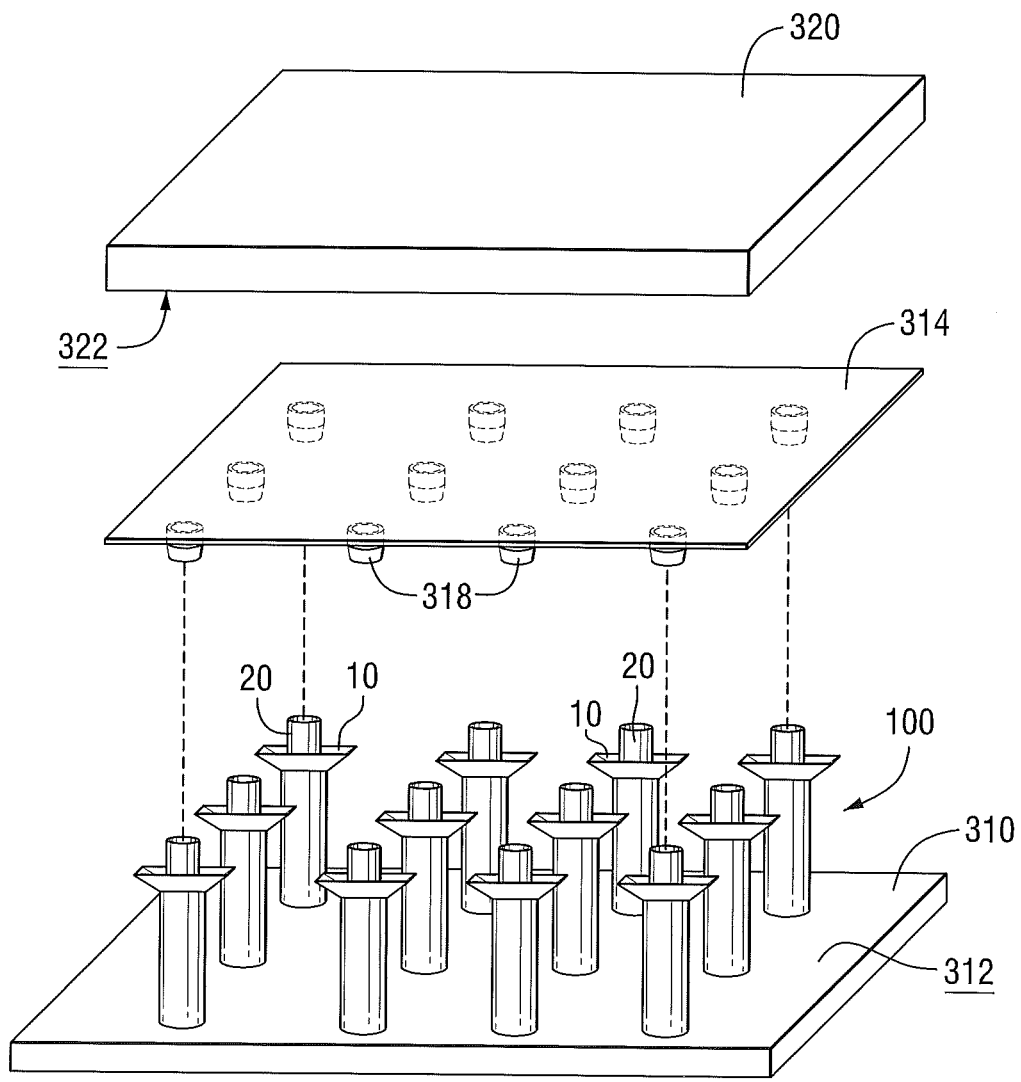
FIG. 11 is an exploded view of an assembly jig in combination with a plurality of cap assemblies.

In a non-limiting embodiment of making the cap 10, a tube 20 may be inserted through the opening 19 (FIGS. 5-7). Optionally, as illustrated in FIG. 11, in a non-limiting embodiment of assembling the cap assembly 100, the first end 22 of the tube is positioned on an assembly jig 310 such that the shell 10 is positioned above a surface 312 of the jig and the cavity 18 of the shell 10 is positioned to receive the first quantity of sealant 13.

In certain embodiments of the invention, a first quantity of sealant 13 is positioned in the cavity 18. In one non-limiting embodiment, a sufficient first quantity of sealant 13 may be used to fill the cavity 18 to just above the surface thereof. In a non-limiting embodiment, the first quantity of sealant 13 is maintained at least partially unhardened by thermally regulating it at a temperature sufficiently below its hardening temperature to at least partially retard hardening of the sealant. Release paper or other similar material well known to those skilled in the art can then be applied over the first quantity of sealant. This packaging at least partially inhibits moisture from developing when the sealant is thermally regulated during storage and transportation, and as the temperature of the sealant increases prior to application. The combination of preformed first quantity of sealant 13 positioned in the cavity 18 of the shell 12 is thermally regulated until application to the fastener and/or substrate. The term "preformed" refers to the dispensing and packaging of the quantity of sealant such that the sealant can be stored and transported prior to its application to the substrate.

The term "thermally regulating" refers to decreasing and/or maintaining the first quantity of sealant 13 at temperatures that retard hardening by at least partially suspending the curing process. Temperature can be decreased to effectively suspend the curing process. In one non-limiting embodiment, the length of time for the curing process to reach completion can correlate inversely with temperature, such that the lower the temperature the greater the suspension in the curing process and rate of retardation of hardening. In one non-limiting embodiment, the decrease and/or maintenance of the temperature can last from the point in time when the first quantity of sealant 13 is made and positioned in the cavity 18 of the shell 10 to the point when the first quantity of sealant 13 is ready for application to the substrate. Hence, cooling may be used during storage and transport of the first quantity of sealant 13, such as shipping the first quantity of sealant 13 under refrigerated conditions or in dry ice.

The temperature to suspend the curing process referred above can vary widely and depends on the shelf life of the first quantity of sealant 13. The date of expiration for sealant relative to temperature varies from sealant composition to sealant composition. In one non-limiting example, the shelf life of a sealant can be 21 days at −40° C. The shelf life can be extended by lowering the temperature. In one non-limiting embodiment, the sealant can be kept at temperatures between and including −100° C. to −25° C. to retard hardening. In another non-limiting embodiment, the sealant can be kept at a maximum temperature of −75° C. In another non-limiting embodiment, the sealant can be kept at a minimum temperature of −55° C. In another non-limiting embodiment, the sealant can be kept at −45° C. The choice of sealant is not critical and a variety of materials known in the art can be used.

The particular choice of sealant generally depends on a number of factors such as the type of substrate and intended end use. Non-limiting examples of commercially available sealants include PR-1776®, PS-890® and PR-1440® from PRC DeSoto International, Inc. (Burbank, Calif.) and AC-236® and AC-250® from AC Tech (PBT Brands, Inc., Hartford Conn.). In addition, this method of preformed at least partially unhardened material can be used for other compositions such as adhesives, coatings, etc.

In the non-limiting embodiments listed above, the first quantity of sealant 13 can be cured or hardened by the addition of heat. In another non-limiting embodiment, the first quantity of sealant 13 can be cured or hardened by oxidation. In this embodiment, the oxidation of the first quantity of sealant 13 can be retarded by limiting the sealant's exposure to air such that the sealant remains partially unhardened.

The term "inhibiting" refers to restraining, impeding, slowing or interfering with a particular reaction or function. This can be accomplished in a number of ways, for example, controlling the environment to which the sealant is exposed. In the case of oxidation, inhibiting refers to restraining, impeding, slowing or interfering with the oxidation of the sealant. In a non-limiting example, oxidation is at least partially inhibited by limiting the sealant's exposure to air or ambient conditions. In the case of the moisture, inhibiting refers to restraining, impeding, slowing or interfering with the development of moisture on the sealant. A non-limiting example comprises at least partially inhibiting moisture by limiting the condensation on the sealant surface.

Optionally, in certain embodiments of the invention, and as illustrated in FIG. 11, after the first quantify of sealant 13 is positioned in the cavity 18 of the shell 12, a first tube support 314 comprising a plurality of nipples 318 is positioned over the cap assemblies 100. Each nipple 318 is substantially aligned with one of the tubes 20 positioned on the assembly jig 310 and is configured for insertion into the second end 24 of the corresponding tube. In certain embodiments, the nipples 318 are inserted into the second ends 24 of the tubes and optionally a base 320 is positioned over the first tube support 314. In certain embodiments, the first tube support 314 is secured to the base 320.

Figure 12:
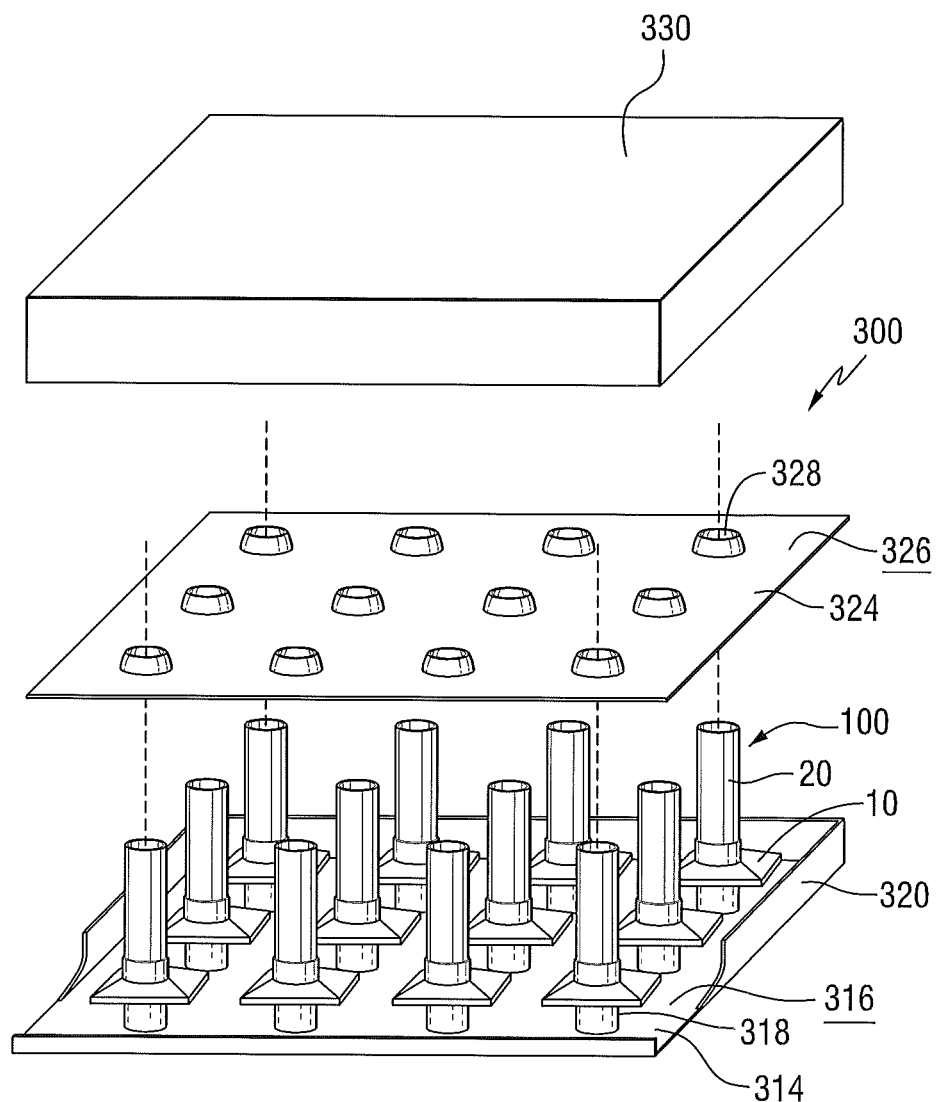
FIG. 12 is an exploded view of a holder in combination with a plurality of cap assemblies and FIG. 13 is an isometric view of a tool, shown in an initial position, for installing the cap of the cap assembly illustrated in FIG. 5 on a fastener.

Optionally, in certain embodiments of the invention, and as illustrated in FIG. 12, after the nipples 318 are inserted into the second end 24 of the tubes and the optional base 320 is positioned thereon, the base 320 is inverted. In certain embodiments, and as illustrated in FIG. 12, the nipples 318 maintain the shells 12 containing the first quantity of sealant 13 a distance above a surface 316 of the first tube support 314 such that the first quantity of sealant 13 is not in contact with the surface 316 of the first tube support, thereby preventing the first quantity of sealant 13 from wicking out of the shell 12.

Optionally, in certain embodiments, and as illustrated in FIG. 12, a second tube support 324 comprising a plurality of holes 328 is positioned over the cap assemblies 100. Each hole 328 is substantially aligned with one of the cap assemblies 100 positioned on the first tube support 314 and is configured for insertion of the first end 22 of the corresponding tube 20. In certain embodiments, a cover 330 is optionally positioned over the second tube support 324.

In certain non-limiting embodiments, the shell 12 may comprise a partially hardened sealant. In certain non-limiting embodiments, the shell 12 may be made by compressing a second quantity of sealant to a predetermined thickness forming the shell 12 with the cavity 18 into which the first quantity of sealant 13 is positioned. The second quantity of sealant can be kept at least partially hardened by thermally regulating it. The shell 12 can be formed by any means known in the art, for example by using an injection-filled mold, stamping, using male and female molds, and the like, carried out at atmospheric, sub-atmospheric, or super-atmospheric pressures. One skilled in the art knows various methods of forming concave shells into a variety of shapes and sizes to fit a particular application. Example methods of forming the shells are identified in U.S. Pat. No. 7,438,974, filed Sep. 26, 2002, incorporated herein by reference.

In certain non-limiting embodiments, a sealant cap package 500 comprising a holder 300 and a plurality of cap assemblies 100 releasably mounted on the holder. The holder 300 is made from materials having thermal properties that reduce the potential for condensation. If moisture is allowed to collect on the sealant it can become lodged between the substrate and the sealant during application, detrimentally affecting the performance of the sealant. A non-limiting embodiment of a sealant cap package 500 is illustrated in FIG. 12. Each cap assembly 100 may comprise a shell 12 having an exterior surface 14 and an interior 16 surface defining a cavity 18, an opening 19 extending through the shell 12 between the interior 16 and exterior 14 surfaces, a first quantity of sealant 13 at least partially filling the cavity 18, and a tube 20 extending through the opening 19 and configured to fit over a shaft 210 of the mechanical fastener 200, wherein the shell 20 is slidably moveable along an axis A of the tube 20. The plurality of cap assemblies may be releasably mounted on a first tube support 314 comprising a plurality of nipples 318 that protrude from a surface 316 thereof. The nipples are configured for insertion into a second end 24 of the tubes and may have a height above the surface 316 of the first tube support that is sufficient to elevate the shells 12 containing the first quantity of sealant 13 a distance above the surface 316 of the first support 314 such that the first quantity of sealant 13 is not in contact with the surface 316, thereby preventing the first quantity of sealant 13 from wicking out of the shell 12. The number of nipples 318 can vary based on the number of cap assemblies 100 needed, size of machinery for dispensing the first quantity of sealant 13 into the cavity 18, etc. In certain embodiments, the first tube support 314 may be secured to or positioned in a base 320. A second tube support 324 comprising a plurality of holes 328 may be positioned over the cap assemblies 100. Each hole 328 is configured for insertion into a first end 22 of the tubes and may stabilize the cap assemblies 100 in the holder 300, such as for stability during storage and transport. In certain embodiments, a cover 330 is positioned over the second tube support 324.

FIGS. 8-10 illustrate a non-limiting embodiment for a method for applying the sealant to a fastener and/or substrate 230 comprises obtaining the preformed first quantity of sealant 13 at a temperature sufficient to at least partially harden the sealant, and contacting the sealant 13 with the substrate 230. Such a temperature can comprise thermally regulating the sealant to increase the temperature gradually or allowing the sealant to reach ambient temperature (20° C.). In another non-limiting embodiment, a method of applying the sealant comprises obtaining a preformed first quantity of sealant 13 in conditions sufficient to retard oxidation, exposing it to air sufficient to oxidize the first quantity of sealant 13 to an at least partially hardened state.

There are many examples of fasteners, such as those having convex, arcuate, or flat surfaces that utilize sealants. FIGS. 8-10 illustrate an example of a fastener 200 sealed using the cap assembly 100. The substrates 230 are fastened by fastener 200 (FIG. 8). The tube 20 is inserted over the shaft 210 of the fastener 200 (FIG. 8). The shell 12 is moved along an axis A of the tube from an initial position (FIG. 8) to an installed positioned where the first quantity of sealant 13 contacts a portion of the mechanical fastener 200 and the substrate 230 in which the mechanical fastener is fastened (FIG. 9). The tube 20 is removed from the opening 19 of the shell 12 such that the fastener 200 is at least partially coated by the first quantity of sealant 13 (FIG. 10). The downward pressing motion (FIG. 9) and the removal of the tube 20 (FIG. 20) displaces a portion of the first quantity of sealant 13 to cause squeeze-out of a small portion of the sealant at the interface between the shell 12 and the substrate 230 (FIGS. 9, 10), at the interface between the shell 12 and the tube 20 (FIG. 9), and/or at the interface between the shell 12 and the fastener 210 (FIG. 10). This excess portion ensures a tight seal between the shell 12 and the substrate 230. The excess portion can be left whole or smoothed over to make a smooth transition between the first quantity of sealant 13 and the substrate 230. When applying the sealant 13 to the fastener 200, and the substrate 230, the first (and optionally second) quantities of sealant can be exposed to temperatures sufficient to at least partially harden the first quantity of sealant 13.

Figure 13:
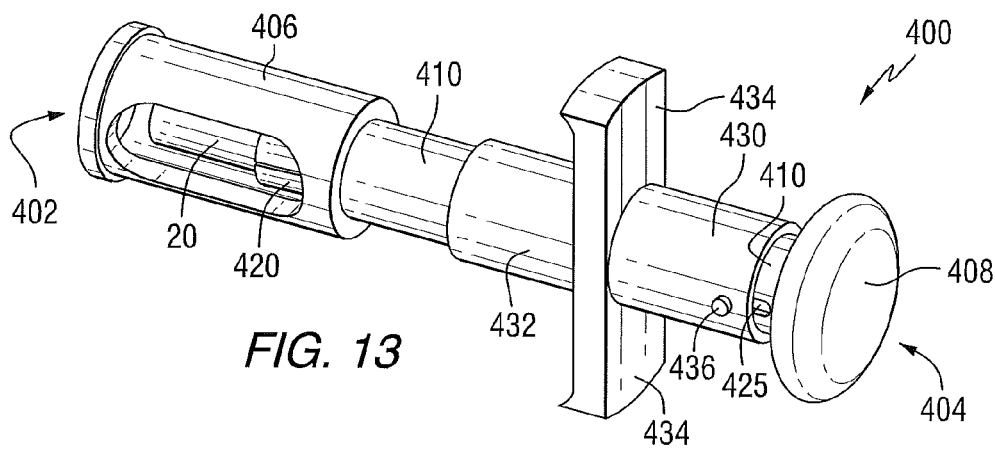
Figure 14:
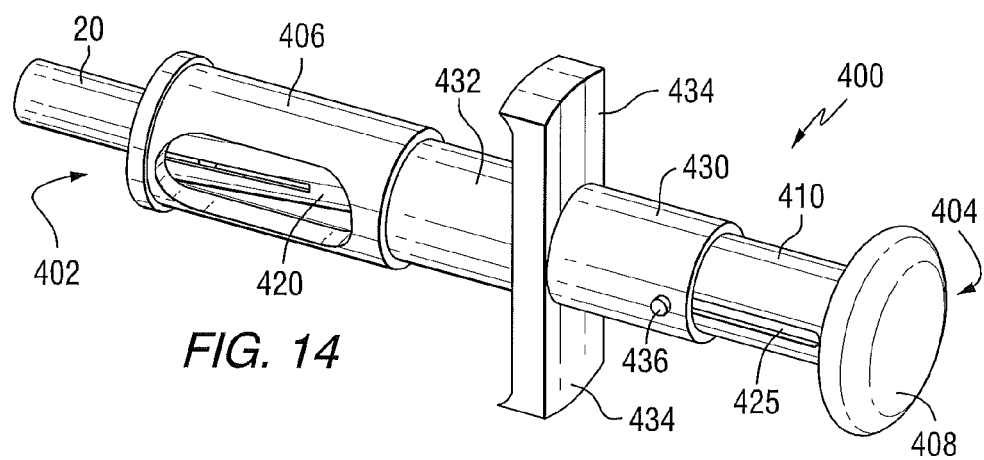
FIG. 14 is an isometric view of the tool illustrated in FIG. 13, shown in an intermediate position.
Figure 15:
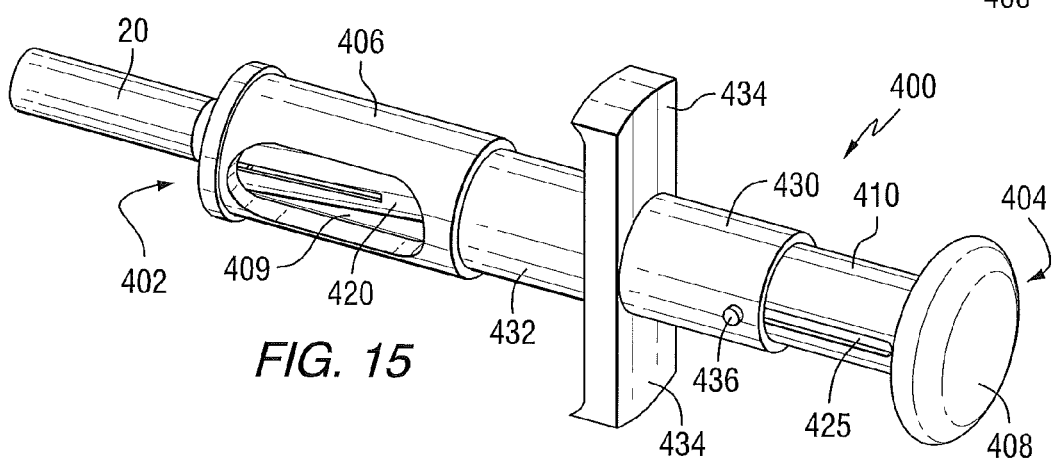
FIG. 15 is an isometric view of the tool illustrated in FIG. 13, shown in an installed position.

In certain embodiments such as the one illustrated in FIGS. 13-15, a driver 400 for installing a cap assembly 100 on a mechanical fastener 200 is disclosed. The driver 400 has distal 402 and proximal 404 ends that are connected by a cylindrical shaft 410. The distal end 402 of the driver 400 includes a generally annular sleeve 406 and the proximal end 404 of the driver 400 includes a butt end 408 that is structured to be engaged by the operator's heel of the hand or thumb. In an embodiment, the distal sleeve 406 and proximal butt end 408 do not move in relation to each other and may be made from a single piece of material.

As further illustrated in FIGS. 13-15, the driver 400 further includes a clamp 420 comprising a slightly tapered cylindrical split sleeve having an internal surface capable of grasping and holding a tube 20 of the cap assembly 100. The clamp 420 is connected to a retractor 430 having a cylindrical shaft 432 that is coaxially mounted around the cylindrical shaft 410 of the driver 400. The retractor 430 has two opposing finger grip extensions 434 extending from its cylindrical shaft 432. The retractor 430 is connected to the clamp 420 by means of a pin 436 or other mechanical fastener secured to a proximal end 424 of the clamp 420.

As further illustrated in FIGS. 13-15, the cylindrical shaft 410 of the driver 400 includes a longitudinal slot 425 through which the pin 436 connecting the retractor 430 to the clamp 420 may extend. When the retractor 430 is pulled from the distal end 402 toward the proximal end 404 of the driver 400, the pin 436 moves in the longitudinal slot 425 in the cylindrical shaft 410 of the driver 400 (FIG. 13). With this arrangement, when the retractor 430 is moved from the distal 402 toward the proximal 404 end of the driver 400, it pulls the clamp 420 axially inside the sleeve 406. In certain embodiments, the retractor 430 may be spring-biased toward the distal end 402 of the driver 400 and an operator can pull the retractor 430 and clamp 420 away from the distal end 402 of the driver 400 against the force of the biasing spring (not shown) while pressing with the palm of the hand or thumb against the butt end 408 of the driver 400 to maintain the distal end 402 of the driver in contact with the shell 12 of the cap 10 when the tube 20 is retracted by the clamp 420. The distal end of the sleeve 406 provides a contact surface for engaging and forcing the shell 12 of the cap assembly (not shown) into its installed position in relation to the fastener (not shown). The slightly tapered cylindrical outer surface of the clamp 420 in combination with at least one axial slot 425 through the side wall of the clamp 420 provides an open position for initially grasping the tube 20 when the clamp 420 is moved distally with respect to the driver 400 (FIG. 15). When the clamp 420 is moved toward the proximal end 404 of the driver 400 its outer surface engages the inner diameter of the cylindrical midsection of the driver 400 and causes the split sections of the clamp 420 to move radially inward to grasp the tube 20 more tightly (FIGS. 13, 14). The inner surface of the clamp 420 may include serrations or other features that help to grip and secure the tube during operation.

The components of the driver 400 may be made of any suitable materials such as metals, plastics, and the like.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

We claim:

1. A cap assembly for sealing a mechanical fastener comprising:
   a shell having an exterior surface and an interior surface defining a cavity;
   an opening extending through the shell between the interior and exterior surfaces;
   a sealant at least partially filling the cavity; and
   a tube extending through the opening and configured to fit over a shaft of the mechanical fastener and is removable from the opening, wherein the shell is slidably moveable along an axis of the tube.

2. The cap assembly according to claim 1, wherein the shell comprises an at least partially hardened sealant.

3. The cap assembly according to claim 1, wherein the sealant is at least partially unhardened.

4. A sealant cap package comprising:
   a holder; and
   a plurality of cap assemblies releasably mounted on the holder, wherein each cap assembly comprises:
   a shell having an exterior surface and an interior surface defining a cavity;
   an opening extending through the shell between the interior and exterior surfaces;
   a sealant at least partially filling the cavity; and
   a tube extending through the opening, wherein the tube is releasably secured to the holder.

5. The sealant cap package according to claim 4, wherein the holder comprises a base including a plurality of nipples each configured to engage a first end of one of the tubes.

6. The sealant cap package according to claim 5, wherein the shell is supported above a surface of the base.

7. The sealant cap package according to claim 5, further comprising an upper tube support comprising a plurality of holes each configured to engage a second end of each of the tubes, wherein the plurality of holes is substantially aligned with the plurality of nipples.

8. The sealant cap package according to claim 4, further comprising an upper tube support comprising a plurality of holes each configured to engage a second end of each of the tubes.

9. The sealant cap package according to claim 4, further comprising a cover positioned above a second end of each of the tubes.

10. A method of installing a cap on a mechanical fastener, wherein the cap comprises a shell having an exterior surface and an interior surface defining a cavity, an opening extending through the shell between the interior and exterior surfaces, a sealant at least partially filling the cavity, and a tube extending through the opening and configured to fit over a shaft of the mechanical fastener, the method comprising:
    inserting a shaft of the mechanical fastener into the tube; and
    sliding the shell along an axis of the tube from an initial position to an installed position wherein the sealant contacts a portion of the mechanical fastener and a substrate in which the mechanical fastener is fastened.

11. The method according to claim 10, further comprising removing the tube from the opening after the shell is at the installed positioned.

12. The method according to claim 10, wherein the shell comprises an at least partially hardened sealant.

13. The method according to claim 10, wherein the sealant is at least partially unhardened.

14. A driver for installing a sealant cap assembly on a mechanical fastener, wherein the sealant cap assembly comprises a shell having an exterior surface and an interior surface defining a cavity, an opening extending through the shell between the interior and exterior surfaces, a sealant at least partially filling the cavity, and a tube extending through the opening and configured to fit over a shaft of the mechanical fastener, wherein the shell is slidably moveable along an axis of the elongated tube, the tool comprising:
    a clamp structured and arranged to releasably engage the tube; and
    a sleeve structured and arranged to move the shell along the axis of the tube from an initial position to an installed position wherein the sealant contacts a portion of the mechanical fastener and a portion of a substrate to which the mechanical fastener is fastened.

15. The driver according to claim 14, wherein the clamp is axially moveable in relation to the sleeve.

16. The driver according to claim 14, wherein the sleeve at least partially surrounds the clamp.

* * * * *